US012355843B2

(12) United States Patent
Jia et al.

(10) Patent No.: US 12,355,843 B2
(45) Date of Patent: Jul. 8, 2025

(54) PROTECTING API KEYS FOR ACCESSING SERVICES

(71) Applicant: INTERNATIONAL BUSINESS MACHINES CORPORATION, Armonk, NY (US)

(72) Inventors: Chun Li Jia, Beijing (CN); Zhi Gang Sun, Beijing (CN); Yue Lin, Beijing (CN); Xin Peng Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 599 days.

(21) Appl. No.: 17/651,908

(22) Filed: Feb. 22, 2022

(65) Prior Publication Data
US 2023/0269298 A1 Aug. 24, 2023

(51) Int. Cl.
*H04L 67/133* (2022.01)
*H04L 9/08* (2006.01)
*H04L 9/32* (2006.01)

(52) U.S. Cl.
CPC .......... *H04L 67/133* (2022.05); *H04L 9/0819* (2013.01); *H04L 9/0838* (2013.01); *H04L 9/32* (2013.01)

(58) Field of Classification Search
CPC ... H04L 67/133; H04L 9/0819; H04L 9/0838; H04L 9/32
See application file for complete search history.

(56) References Cited

U.S. PATENT DOCUMENTS 9,503,442 B1 * 11/2016 Griffin ................ H04L 63/0838
9,720,750 B1    8/2017 Abrams
9,871,655 B2    1/2018 Camenisch
(Continued)

FOREIGN PATENT DOCUMENTS

CN    109639419 A    4/2019
WO    2010072158 A1    7/2010
WO    2022003505 A1    1/2022

OTHER PUBLICATIONS

International Searching Authority, "International Search Report and Written Opinion", File reference PF221189PCT, International application No. PCT/CN2023/077333, International filing date Feb. 21, 2023, Dated Apr. 3, 2023, 9 pages.
(Continued)

*Primary Examiner* — Nam T Tran
(74) *Attorney, Agent, or Firm* — Joseph P. Curcuru

(57) ABSTRACT

A method, system, and computer program product for protecting API KEYs for accessing services in a cloud environment are disclosed. A first request for generating a virtual key for a user in an organization to access a service in a cloud environment is received. The first request includes information of the organization, an identity of the user, and information of the service. A first authentication request is sent to an identity provider of the organization based on the information of the organization and the identity of the user. In response to the first authentication being successful, an API key for the organization to access the service is determined. The virtual key for the user to access the service is generated based on the API key, the information of the organization, and the identity of the user. The virtual key is returned as a response of the first request.

20 Claims, 7 Drawing Sheets

(56) References Cited

U.S. PATENT DOCUMENTS

| | | |
|---|---|---|
| 10,326,748 B1 | 6/2019 | Brisebois |
| 10,554,419 B2 | 2/2020 | Camenisch |
| 11,228,573 B1 | 1/2022 | Rangasamy |
| 2008/0028453 A1 | 1/2008 | Nguyen |
| 2014/0068258 A1 | 3/2014 | Chao |
| 2019/0149320 A1* | 5/2019 | Keselman ................ H04L 9/14 380/279 |
| 2019/0394024 A1 | 12/2019 | Vepa |
| 2020/0322324 A1* | 10/2020 | Chang ...................... G06F 9/54 |
| 2021/0091951 A1 | 3/2021 | Wilson |
| 2021/0234707 A1 | 7/2021 | Venketesan |
| 2021/0281555 A1* | 9/2021 | He ........................ H04L 63/083 |
| 2022/0021677 A1* | 1/2022 | Lee ....................... H04L 67/133 |
| 2023/0153426 A1* | 5/2023 | Grobelny ............. H04L 9/3234 726/22 |

OTHER PUBLICATIONS

Mell et al., "The NIST Definition of Cloud Computing", National Institute of Standards and Technology, Special Publication 800-145, Sep. 2011, pp. 1-7.

* cited by examiner

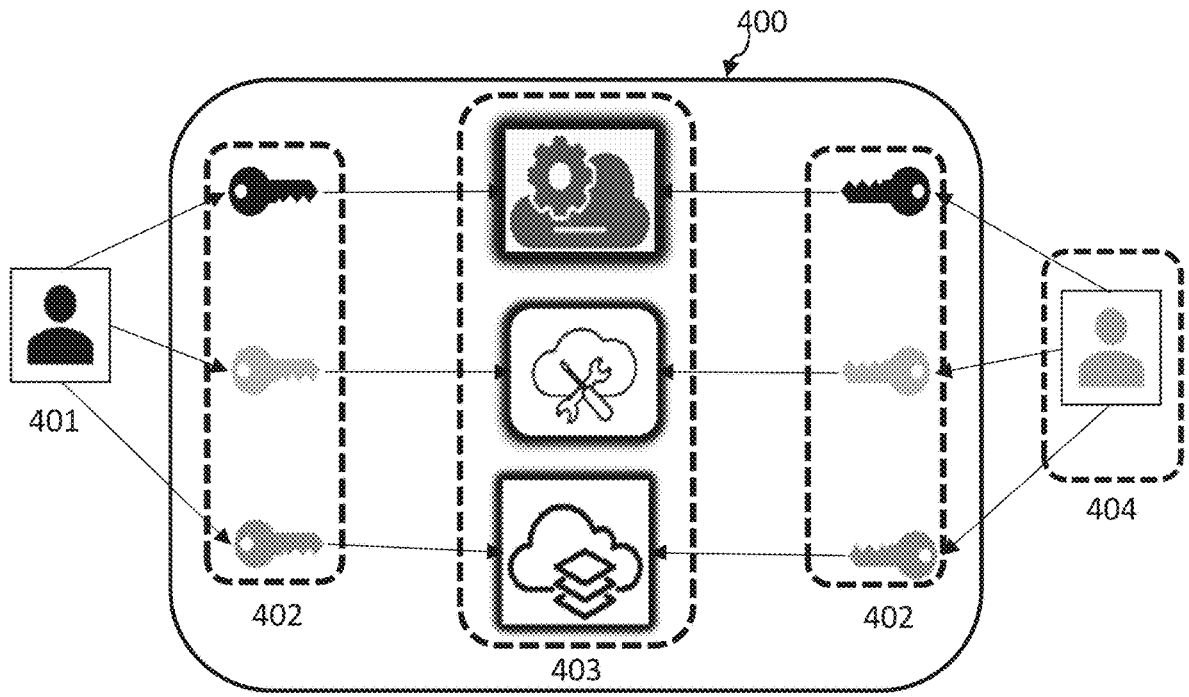

FIG. 4A

```
{
 "api_key": "o9nKQ9rXhTkLNPIIDr4PNQvWM_81_UMvjSZfL1k7_9PBX9",
 "iam_apikey_description": "Auto-generated for key 728123b5-cd48-435a-b448-cbe766cf8ce4",
 "iam_apikey_name": "Service credentials-1",
 "iam_role_crn": "crn:v1:cloud:public:iam:::serviceRole:Manager",
 "iam_serviceid_crn": "crn:v1:cloud:public:iam-identity::a/f20a1f4e79ead7880f8459a41c131fc6x::serviceid:ServiceId-bc5ddb6a-127d-4f8c-9d78-4ab1949685e5",
 "instance_id": "4878d68b-a250-4246-a658-b2d4efeca23851",
 "kafka_admin_url": "https://02x5x33pj6p5r3nj.svc05.us-east.eventstreams.cloud.com",
 "kafka_brokers_sasl": [
   "broker-2-02x5x33pj6p5r3nj.kafka.svc05.us-east.eventstreams.cloud.com:9093"
 ],
 "kafka_http_url": "https://02x5x33pj6p5r3nj.svc02.us-east.eventstreams.cloud.com",
 "password": "o9nKQ9rXhTkLNPIIDr4PNQX8vWM_81_UMvjSZfL1k7_9PB",
 "user": "token"
}
```

PROTECTING API KEYS FOR ACCESSING SERVICES

FIELD

The present disclosure relates to computing technologies and, more specifically, to methods, systems, and computer program products for protecting API KEYs for accessing services in a cloud environment.

BACKGROUND

With the rise of service (such as a microservice) in a cloud environment, many large-scale projects have hundreds of services in a cloud environment. Now the access to application program interfaces (APIs) of some public services has become more and more common. For convenience, API keys are often provided for users to access these public services.

SUMMARY

The present disclosure provides a computer-implemented method, system, and computer program product for protecting API KEYs for accessing services in a cloud environment. The method may comprise receiving, by one or more processors, a first request for generating a virtual key for a user in an organization to access a service in a cloud environment, wherein the first request comprises information of the organization, an identity of the user in the organization, and information of the service, and wherein an API key is required to access the service. The method may also comprise sending, by the one or more processors, a first authentication request to an identity provider of the organization based on the information of the organization and the identity of the user in the organization. The method may also comprise determining, by the one or more processors, whether the first authentication is successful. The method may also comprise in response to the first authentication being successful, determining, by the one or more processors, the API key for the organization to access the service; generating, by the one or more processors, the virtual key for the user to access the service based on the API key, the information of the organization and the identity of the user in the organization; and returning, by the one or more processors, the virtual key as a response of the first request.

The above summary is not intended to describe each illustrated embodiment or every implementation of the present disclosure.

BRIEF DESCRIPTION OF THE DRAWINGS

The drawings comprised in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 4A depicts a schematic diagram of an exemplary usage scenario of API Keys for accessing services in a cloud environment, according to some embodiments.

FIG. 4B depicts an exemplary credential for a user to access a service in a cloud environment.

Figure 1:
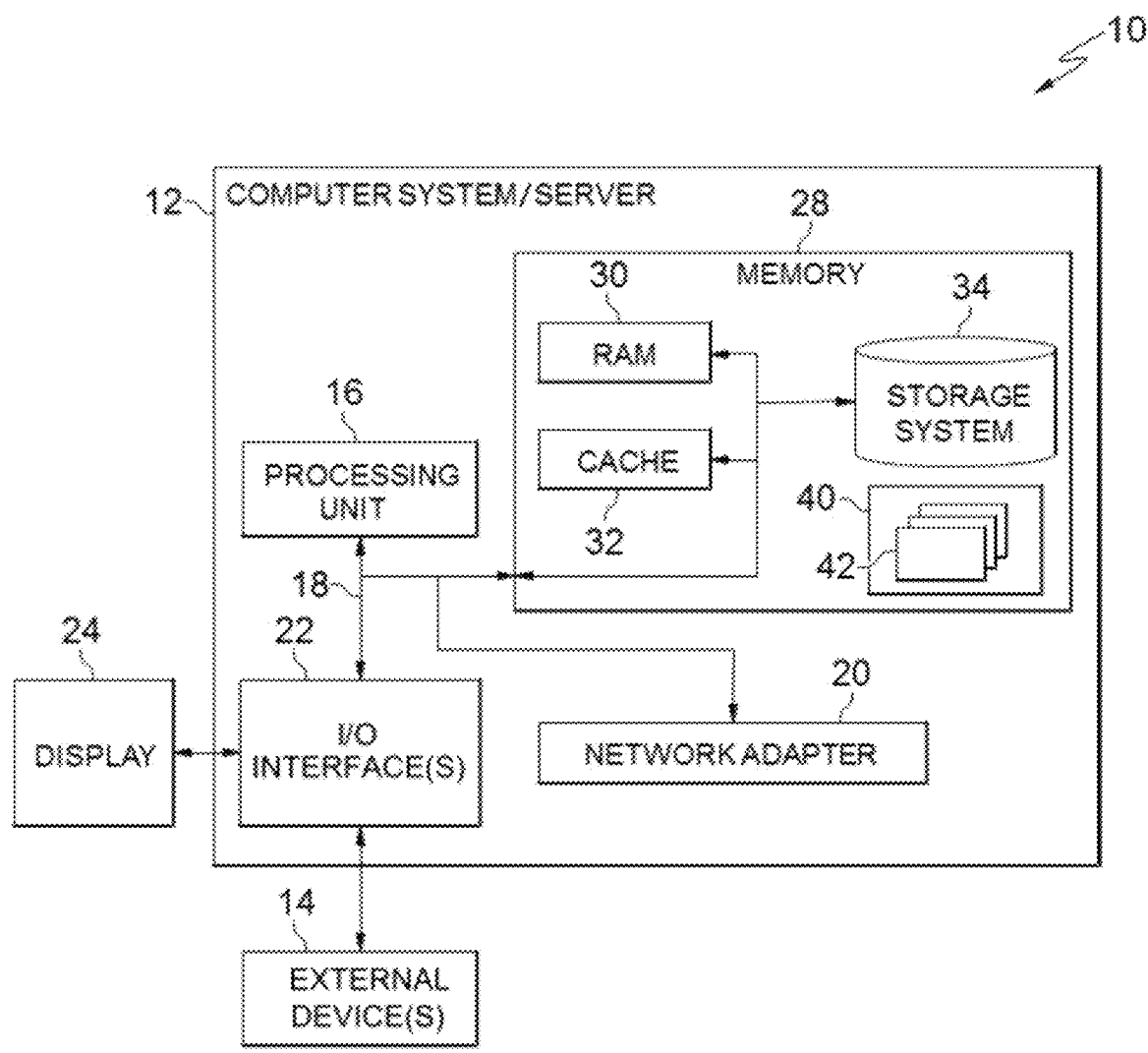
FIG. 1 depicts a block diagram of an example computer system environment, according to some embodiments.

While the computer system, method, and computer program described herein are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

The following description with reference to the accompanying drawings is provided to assist in a comprehensive understanding of exemplary embodiments as defined by the claims and their equivalents. It comprises various specific details to assist in that understanding but these are to be regarded as merely exemplary. Accordingly, those of ordinary skill in the art will recognize that various changes and modifications can be made without departing from the scope and spirit of the embodiments described herein. In addition, descriptions of well-known functions and constructions may be omitted for clarity and conciseness.

In the following, reference is made to various embodiments. However, it should be understood that the disclosure is not limited to specific described embodiments. Instead, any combination of the following features and elements, whether related to different embodiments or not, is contemplated to implement and practice the method, computer system, and computer program described herein. Furthermore, although embodiments may achieve advantages over other possible solutions and/or over the prior art, whether a particular advantage is achieved by a given embodiment is not limiting. Thus, the following aspects, features, embodiments, and advantages are merely illustrative and are not considered elements or limitations of the appended claims except where explicitly recited in a claim(s).

The terms and words used in the following description and claims are not limited to the bibliographical meanings, but, are merely used to enable a clear and consistent understanding of the disclosure. Accordingly, it should be apparent to those skilled in the art that the following description of exemplary embodiments is provided for illustration purpose only and not for the purpose of limiting the disclosure as defined by the appended claims and their equivalents.

It is to be understood that the singular forms "a," "an," and "the" comprise plural referents unless the context clearly dictates otherwise. Thus, for example, reference to "a component surface" comprises reference to one or more of such surfaces unless the context clearly dictates otherwise.

As previously described, with the rise of service (such as a microservice) in a cloud environment, many large-scale projects have hundreds of services in a cloud environment. Now the access to application program interfaces (APIs) of some public services has become more and more common.

For convenience, API keys are often provided for users to access these public services. However, in the current solution, an API key for accessing a service is always shared in an organization. When a member of the organization has left the organization, the solution may lead serious security risk for the organization. It may be advantageous, therefore, to generate keys based on verifying whether an individual is a member of the organization.

Referring to FIG. 1, computer system 100 is a computer system/server 102 is shown in the form of a general-purpose computing device, according to some embodiments. In some embodiments, computer system/server 102 is located on the linking device. In some embodiments, computer system 102 is connected to the linking device. The components of computer system/server 102 may comprise, but are not limited to, one or more processors processors 110, a system memory 160, and a bus 115 that couples various system components comprising system memory 160 to the one or more processors 110.

Bus 115 represents one or more of any of several types of bus structures, comprising a memory bus or memory controller, a peripheral bus, an accelerated graphics port, and a processor or local bus using any of a variety of bus architectures. By way of example, and not limitation, such architectures comprise Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 102 typically comprises a variety of computer system readable media. Such media may be any available media that is accessible by computer system/server 102, and it comprises both volatile and non-volatile media, removable and non-removable media.

System memory 160 can comprise computer system readable media in the form of volatile memory, such as random-access memory (RAM) 162 and/or cache memory 164. Computer system/server 102 may further comprise other removable/non-removable, volatile/non-volatile computer system storage media. By way of example only, storage system 165 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 115 by one or more data media interfaces. As will be further depicted and described below, memory 160 may comprise at least one program product having a set (e.g., at least one) of program modules that are configured to carry out the functions of embodiments disclosed herein.

Program/utility 168, having a set (at least one) of program modules 169, may be stored in memory 160 by way of example, and not limitation, as well as an operating system, one or more application programs, other program modules, and program data. Each of the operating system, one or more application programs, other program modules, and program data or some combination thereof, may comprise an implementation of a networking environment. Program modules 169 generally carry out the functions and/or methodologies of embodiments as described herein.

Computer system/server 102 may also communicate with one or more external devices 140 such as a keyboard, a pointing device, a display 130, etc.; one or more devices that enable a user to interact with computer system/server 102; and/or any devices (e.g., network card, modem, etc.) that enable computer system/server 102 to communicate with one or more other computing devices. Such communication can occur via Input/Output (I/O) interfaces 120. Still yet, computer system/server 102 can communicate with one or more networks such as a local area network (LAN), a general wide area network (WAN), and/or a public network (e.g., the Internet) via network adapter 150. As depicted, network adapter 150 communicates with the other components of computer system/server 102 via bus 115. It should be understood that although not shown, other hardware and/or software components could be used in conjunction with computer system/server 102. Examples comprise, but are not limited to: microcode, device drivers, redundant processors, external disk drive arrays, RAID systems, tape drives, and data archival storage systems, etc.

It is to be understood that although this disclosure comprises a detailed description on cloud computing, implementation of the teachings recited herein are not limited to a cloud computing environment. Rather, the embodiments disclosed herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may comprise at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure comprising network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure comprising networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can comprise operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that comprises a network of interconnected nodes.

Figure 2:
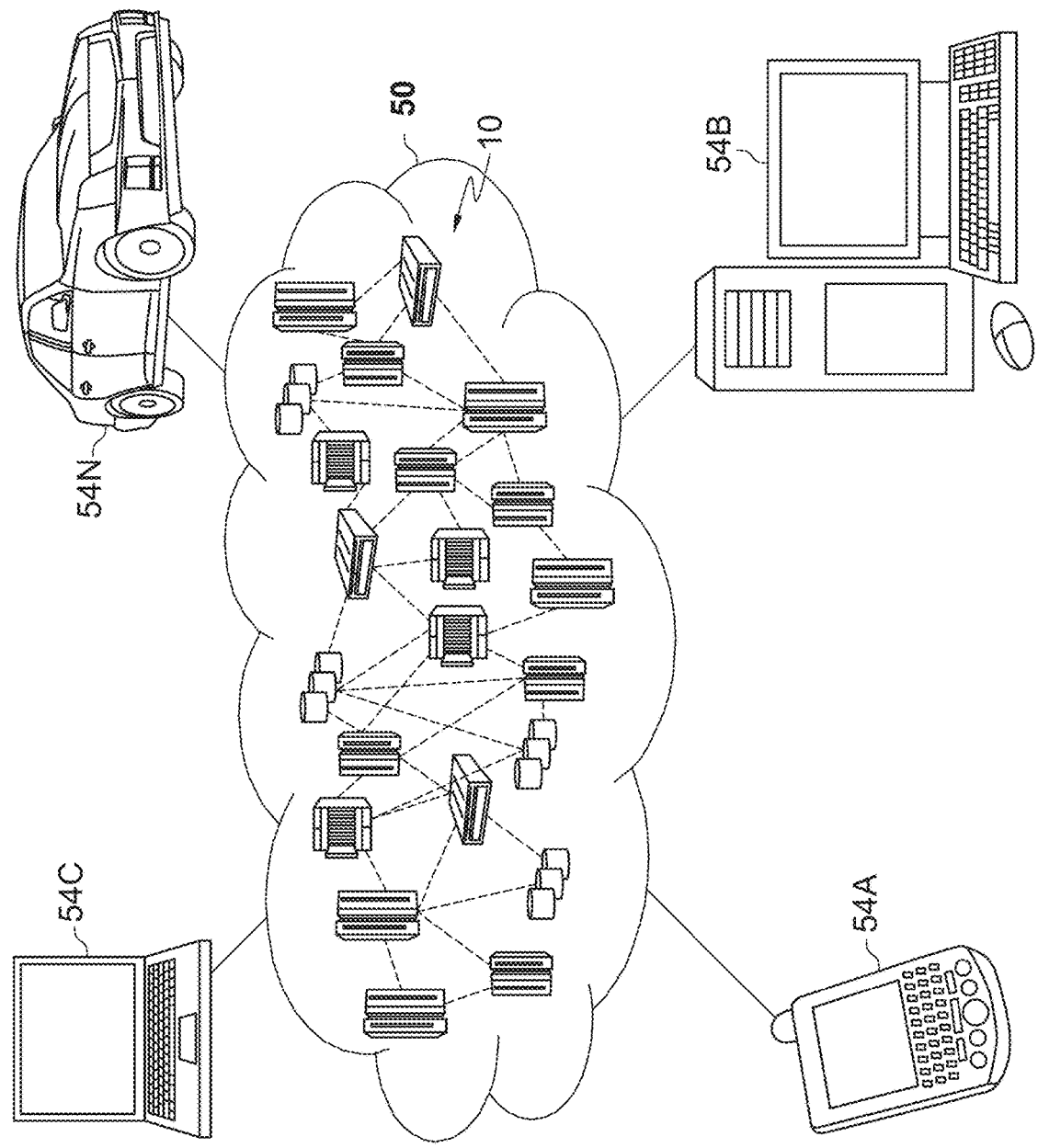
FIG. 2 depicts a cloud computing environment, according to some embodiments.

Referring now to FIG. 2, illustrative cloud computing environment 50 is depicted, according to some embodiments. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
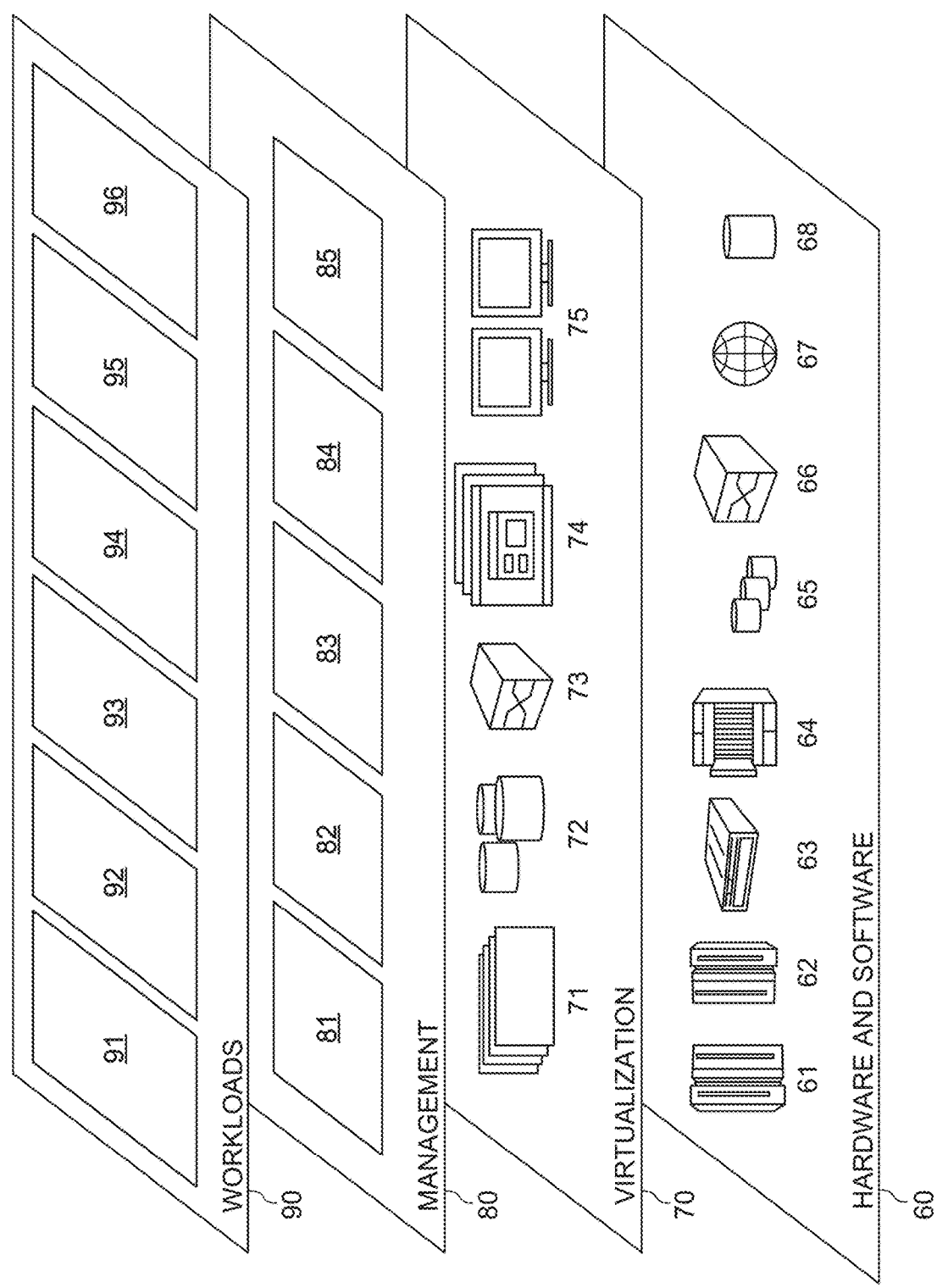
FIG. 3 depicts abstraction model layers, according to some embodiments.

Referring now to FIG. 3, a set of functional abstraction layers 300 provided by cloud computing environment 50 (FIG. 2) is shown, according to some embodiments. It should be understood in advance that the components, layers, and functions shown in FIG. 3 are intended to be illustrative only and embodiments disclosed herein are not limited thereto. As depicted, the following layers and corresponding functions are provided:

Hardware and software layer 60 comprises hardware and software components. Examples of hardware components comprise: mainframes 61; RISC (Reduced Instruction Set Computer) architecture-based servers 62; servers 63; blade servers 64; storage devices 65; and networks and networking components 66. In some embodiments, software components comprise network application server software 67 and database software 68.

Virtualization layer 70 provides an abstraction layer from which the following examples of virtual entities may be provided: virtual servers 71; virtual storage 72; virtual networks 73, comprising virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer comprise: mapping and navigation 91; software development and lifecycle management 92; virtual classroom education delivery 93; data analytics processing 94; transaction processing 95; and API key protection 96.

An API key is a token for a user to access a public service in a cloud environment. In one existing solution, the cloud environment may generate an API key for a service and assign a credential comprising the API key to a user when the user registers to the service. In another existing solution, the cloud environment may generate the API key when the user requests the API key for accessing the service. FIG. 4A depicts a schematic diagram of an exemplary usage scenario of API Keys for accessing services in a cloud environment, according to some embodiments. Refer to FIG. 4A, a user 401 may register with a plurality of services 403 in a cloud environment 400, and the user 401 may obtain a plurality of credentials each comprising an API key corresponding to one of the plurality of services 403. The user 401 may provide the plurality of credentials comprising the plurality API keys to a user 404, then the user 404 may access each of the plurality of services 403 using a corresponding credential comprising a corresponding API key in the plurality of API keys 402.

As part of a credential for a user to access a service in a cloud environment, an API key is a long string of a composition of numbers, letters, characters, and the like. FIG. 4B depicts an exemplary credential 410 for a user to access a service in a cloud environment. Referring to FIG. 4B, the credential 410 comprises an API key 420 and other information.

During development, an API key for accessing a service is always shared in a developing team. And during operation and maintenance, an API key for accessing a service may be shared in an organization. This situation may lead to a security risk. For example, a member who obtained an API key may access a corresponding service using a credential comprising the API key after the member leaves the organization, which makes the member have opportunity to, such as, change data of the organization by accessing the service. The action of changing data may lead serious security risk for the organization. On the other hand, it's difficult to revoke all API keys obtained by the member who has left the organization.

Figure 5:
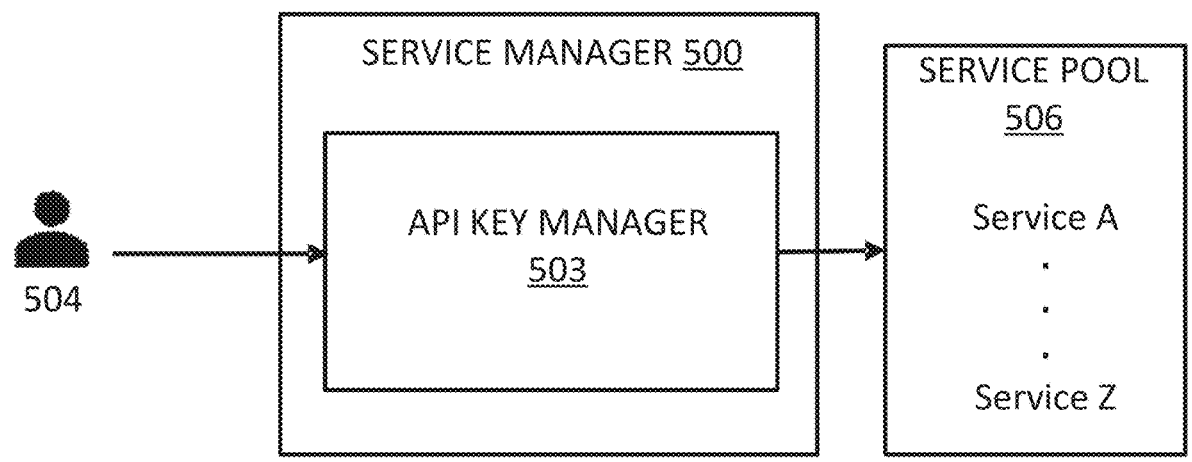
FIG. 5 depicts a schematic diagram of an existing service manager, according to some embodiments.

FIG. 5 depicts a schematic diagram of an existing service manager 500, according to some embodiments. Referring to FIG. 5, the service manager 500 comprises an API key manager 503. In some solutions, the API key manager 503 may generate a plurality of API keys for a plurality of services in a service pool 506 and maintain mappings between each respective API key of the plurality of API keys and a corresponding service of the plurality of services. When a user 504 registers with the service manager 500 to access a service, such as a service A, in the service pool 506, the API key manager 503 may receive a request from the service manager 500 for providing an API key. Then the API key manager 503 may select an API key from the generated plurality keys for the user 504 to access the service A. In some other solutions, when the user 504 in the organization requests for an API key to access the service A in the service pool 506, the API key manager 503, in response to the request, may generate the API key for the user 504 to access the service A instead of generating API key prior to the request, and then add a mapping between the generated API key and the service A. In both kinds of solutions, if the user 504 requests to access the service A with a credential comprising the API key, the API key manager 503 may verify the API key and route the request to the service A based on the mapping. In addition, if the user 504 who loses the identity in the organization (such as leaves the organization) accesses the service A with a previous obtained API key, the API key manager 503 may still verify the API key and route the request to the service A based on the mapping. In other words, the API key manager 503 does not verify the identity of the user, which may bring security risks to the organization.

Therefore, there is a need to develop a method, a system, and a program product for protecting API keys for accessing services in a cloud environment.

According to some embodiments, to protect an API key for accessing a service in a cloud environment, a virtual key may be provided for a user instead of providing the API key itself to the user directly and each user may apply for his/her virtual key for a specific service. A virtual key for a user to access a service may be generated based on at least a corresponding API key for accessing the service and identity of the user in the organization. When the user accesses the service with his/her virtual key, the identity of the user in the organization can be obtained from the virtual key and the identity can be authenticated by an identity provider of the organization. If the user's identity cannot be authenticated, i.e., the user is not a member of the organization, the access request will be rejected to avoid the security risk caused by the unprotected API key, so as to achieve the purpose of maintaining the sustainability of services and meeting strict security regulations.

Figure 6:
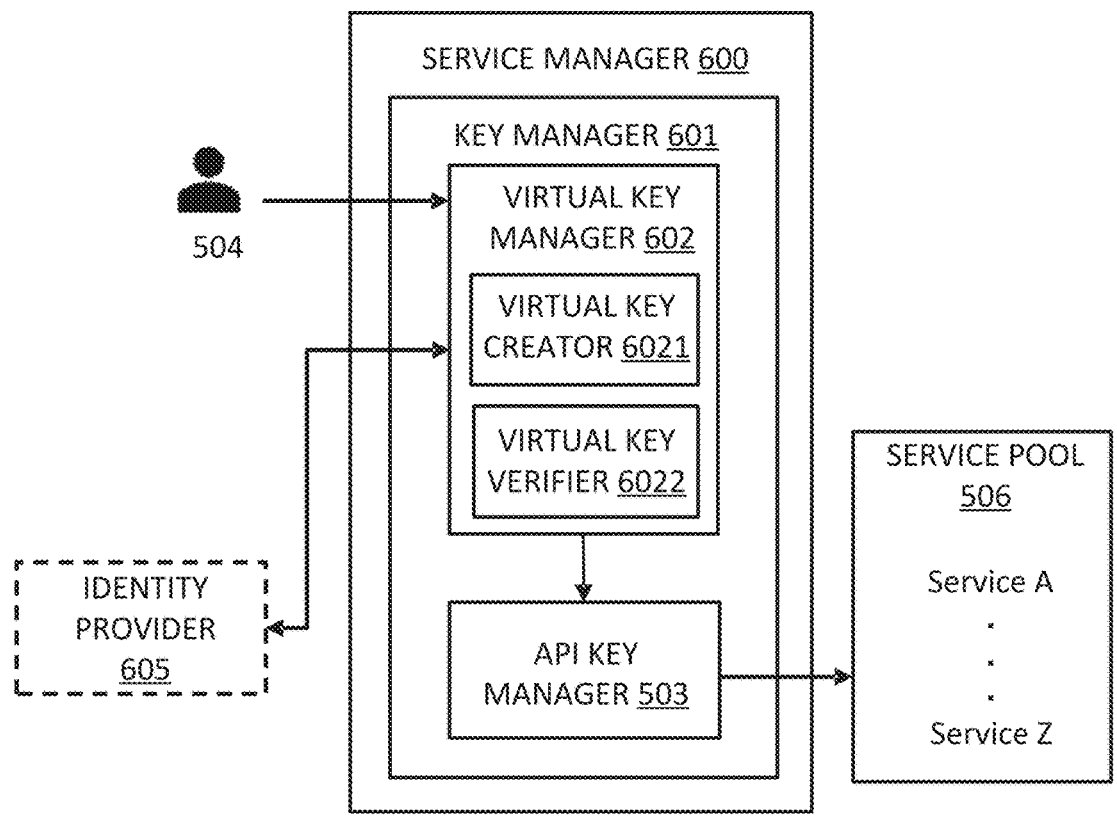
FIG. 6 depicts a schematic diagram of a proposed service manager, according to some embodiments.

FIG. 6 depicts a schematic diagram of a proposed service manager 600, according to some embodiments. Though there are many components in the service manager 600, only the components related to the disclosure are considered in this description, and other components unrelated to this disclosure are ignored. Referring to FIG. 6, the service manager 500 may comprise a key manager 601 which may comprise a virtual key manager 602 and the existing API key manager 503.

All components inside of the service manager 600 are connected directly or indirectly via communication network (not shown in FIG. 6). The communication network in FIG. 6 may comprise various types of communication networks, such as a wide area network (WAN), local area network (LAN), a telecommunication network, a wireless network, a public switched network and/or a satellite network. The communication network may comprise connections, such as wire, wireless communication links, or fiber optic cables.

Each component in the service manager 600 may be, for example, a mobile device, a telephone, a personal digital assistant, a netbook, a laptop computer, a tablet computer, a desktop computer, or any type of computing device capable of running a program and accessing a network. The service manager 600 may operate in a cloud computing service model, such as Software as a Service (SaaS), Platform as a Service (PaaS), or Infrastructure as a Service (IaaS). The service manager 600 may also be located in a cloud computing deployment model, such as a private cloud, community cloud, public cloud, or hybrid cloud.

Referring to FIG. 6, the virtual key manager 602 may be configured to create and/or withdraw a virtual key for a user in an organization to access a service. The virtual key manager 602 may comprise a virtual key creator 6021 and a virtual key verifier 6022. Specifically, as an API key for the organization is required for all users in the organization to access a service, the virtual key creator 6021 may receive a first request for generating a virtual key for a user in an organization to access a service in a cloud environment. In some embodiments, the first request may comprise information of the organization, an identity of the user in the organization, and information of the service. The first request may be from the user who requests a private virtual key to access the service or from the service manager 600 which may receive a request from the user to register with the service. The information of an organization may be an ID of the organization, or a name of the organization, or a special code of the organization, etc. which may be used to obtain an identity provider 605 of the organization to authenticate the identity of the user in the organization. The identity of the user in the organization may be an ID of the user in the organization, or a name of the user in the organization, etc. which will be used to be authenticated by the identity provider 605. The information of the service may be ID of the service or name of the service in a service pool 506, which can be used to uniquely identify the service.

Then the virtual key creator 6021 may send a first authentication request to an identity provider 605 of the organization based on the information of the organization and the identity of the user in the organization. The identity provider 605 may be a service provided by the organization to verify the identity of the user, e.g., authenticate the identity of the user in the organization. If the authentication is successful and there is no virtual key for the user to access the service (e.g., it is first time for the user to request the virtual key for accessing the service), the virtual key creator 6021 may determine the API key for the organization to access the service. In some embodiment, the virtual key creator 6021 may determine the API key by querying the API key for the organization to access the service to a storage which store a mapping between API keys and organizations. In some embodiments, the API key manager 503 may generate the API key for the organization at this time point. After obtaining the API key, the virtual key creator 6021 may generate a virtual key for the user to access the service based on the API key, the information of the organization and the identity of the user in the organization. Then the API key manager 503 may return the virtual key as a response of the first request.

In this way, each user of the organization may apply for a private virtual key to access a specific service, so that each user in the organization has a private virtual key mapping to the API key for the organization to access the specific service and each user does not know the content of the API key. In addition, only a member who has an identity in the organization can apply for a private virtual key for accessing a specific service accessible for the organization.

In some embodiments, when generating the virtual key, the virtual key creator 6021 may encrypt a combination of the API key, the information of the organization and the identity of the user in the organization into ciphertext, which is used as the virtual key. In some embodiments, the virtual key creator 6021 may use a key generated only by itself to encrypt the combination information using any symmetric encryption algorithm to obtain the virtual key. Later, the virtual key may be decrypted by the virtual key creator 6021 using the generated key to obtain the API key, the information of the organization and the identity of the user in the organization. In some embodiments, the virtual key creator 6021 may use its public key to encrypt the combination information to obtain the virtual key. And later, the virtual key may be decrypted by the virtual key creator 6021 using its private key to obtain the API key, the information of the organization and the identity of the user in the organization. Those skilled in the art may understand that any encryption algorithm can be used to encrypt the combination information to obtain the virtual key and a corresponding decryption algorithm can be used to decrypt the virtual key to obtain the API key, the information of the organization and the identity of the user in the organization later.

In some embodiment, after generating the virtual key, the virtual key creator 6021 may store a mapping between the virtual key for the user and the identity of the user in the organization, which means that the virtual key creator 6021 stores the virtual key for the user. If the virtual key needs to be withdrawn, the virtual key creator 6021 may just delete the mapping. In addition, the mapping can be used to determine whether it is the first time for the user to apply for the virtual key to avoid repeatedly generating the virtual key for the user. If the first authentication is successful and there is the virtual key for the user based on the stored mapping, the virtual key creator 6021 may return the virtual key as a response of the first request instead of generating the virtual key as a response of the first request.

In some embodiment, if the first authentication is unsuccessful, i.e., the user with the virtual key is not a member of the organization now, the virtual key creator 6021 may reject the first request to avoid the security risk caused by the unprotected API key, so as to achieve the purpose of maintaining the sustainability of services and meeting strict security regulations.

Still referring to FIG. 6, the virtual key verifier 6022 may be configured to verify a request for accessing a service. Specifically, the virtual key verifier 6022 may receive a second request for the user to access the service in the cloud environment, the second request comprising the virtual key for the user to access the service. The virtual key verifier 6022 may then decrypt the virtual key for the user to obtain a decrypted API key, decrypted information of the organization and decrypted identity of the user in the organization, as mentioned before. The virtual key verifier 6022 may then send a second authentication request to the identity provider of the organization based on the decrypted information of the organization to authenticate the decrypted identity of the user in the organization. If the virtual key verifier 6022 determines that the second authentication is unsuccessful, i.e., the user with the virtual key is not a member of the organization now, the virtual key verifier 6022 may reject the second request to avoid the security risk caused by the unprotected API key, so as to achieve the purpose of maintaining the sustainability of services and meeting strict security regulations. Alternatively, the virtual key verifier 6022 may determine whether there is the virtual key corresponding to the decrypted identity of the user in the organization based on the stored mapping between the virtual key for the user and the identity of the user in the organization. If there is the virtual key corresponding to the decrypted identity of the user in the organization, the virtual key verifier 6022 may withdraw the mapping to withdraw the virtual key.

In some embodiment, any mapping in the above description can be stored in, such as, a table in a database, an XML file, a TXT file, and the like. Those skilled in the art my understand that the virtual key creator 6021 may use other methods to store virtual keys, entities of users, API keys, and services and their relationship instead of the mapping.

It should be noted that the virtual key manager 602 in the service manager 600 according to embodiments, could be implemented by computer system/server 102 of FIG. 1. It also should be noted that the virtual key manager 602 in the service manager 600 according to embodiments could be implemented in any computer system. In some embodiments, the virtual key manager 602 in the service manager 600 can a cloud computing environment (such as cloud computing environment 50 from FIG. 2) or a service thereof.

Figure 7:
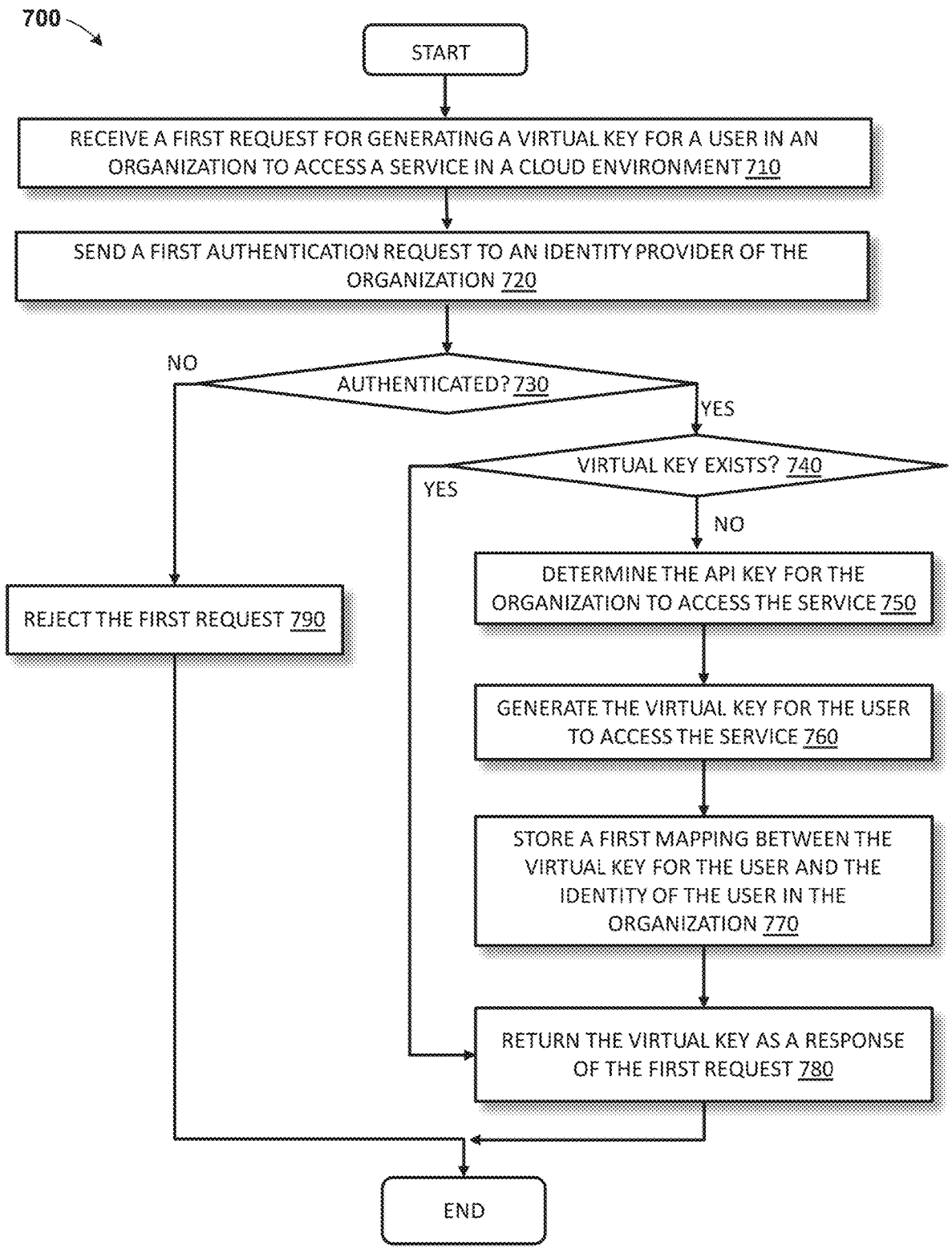
FIG. 7 depicts a flowchart for a virtual key manager in a service manager to create a virtual key according to some embodiments.

FIG. 7 depicts a flowchart 700 for the virtual key manager 602 in the service manager 600 to create a virtual key according to some embodiments. The flowchart 700 may be implemented by the virtual key manager 602 in the service manager 600, or other suitable computer/computing systems. For ease of understanding, the flowchart 700 will be described with reference to FIG. 6.

At 710, the virtual key manager 602 may receive a first request for generating a virtual key for a user in an organization to access a service in a cloud environment, wherein the first request comprises information of the organization, an identity of the user in the organization, and information of the service, and wherein an API key is required to access the service.

At 720, the virtual key manager 602 may send a first authentication request to an identity provider of the organization based on the information of the organization and the identity of the user in the organization.

At 730, the virtual key manager 602 may determine whether the first authentication is successful or not.

At 740, if the virtual key manager 602 determines that the first authentication is successful, the virtual key manager 602 may further determine whether there is stored virtual key for the user for accessing the service.

If virtual key manager 602 determines that the first authentication is successful and there is no virtual key for the user to access the service, the virtual key manager 602 may first determine the API key for the organization to access the service at 750, and then generate the virtual key for the user to access the service based on the API key, the information of the organization and the identity of the user in the organization at 760, and then return the virtual key as a response of the first request at 780. Then the flowchart 700 is ended Alternatively, the virtual key manager 602 may, at 770, store a first mapping between the virtual key for the user and the identity of the user in the organization, so that the virtual key manager 602, at 740, may further determine whether there is the stored virtual key for the user to access the service based on the first mapping. If the virtual key manager 602 determines that the first authentication is successful and there is a virtual key for the user to access the service, the virtual key manager 602 may go to 780 directly to return the virtual key as a response of the first request.

At 790, if the first authentication is unsuccessful, the virtual key manager 602 may reject the first request to avoid a security risk caused by the unprotected API key, so as to achieve the purpose of maintaining the sustainability of services and meeting strict security regulations. Then the flowchart 700 is ended.

Figure 8:
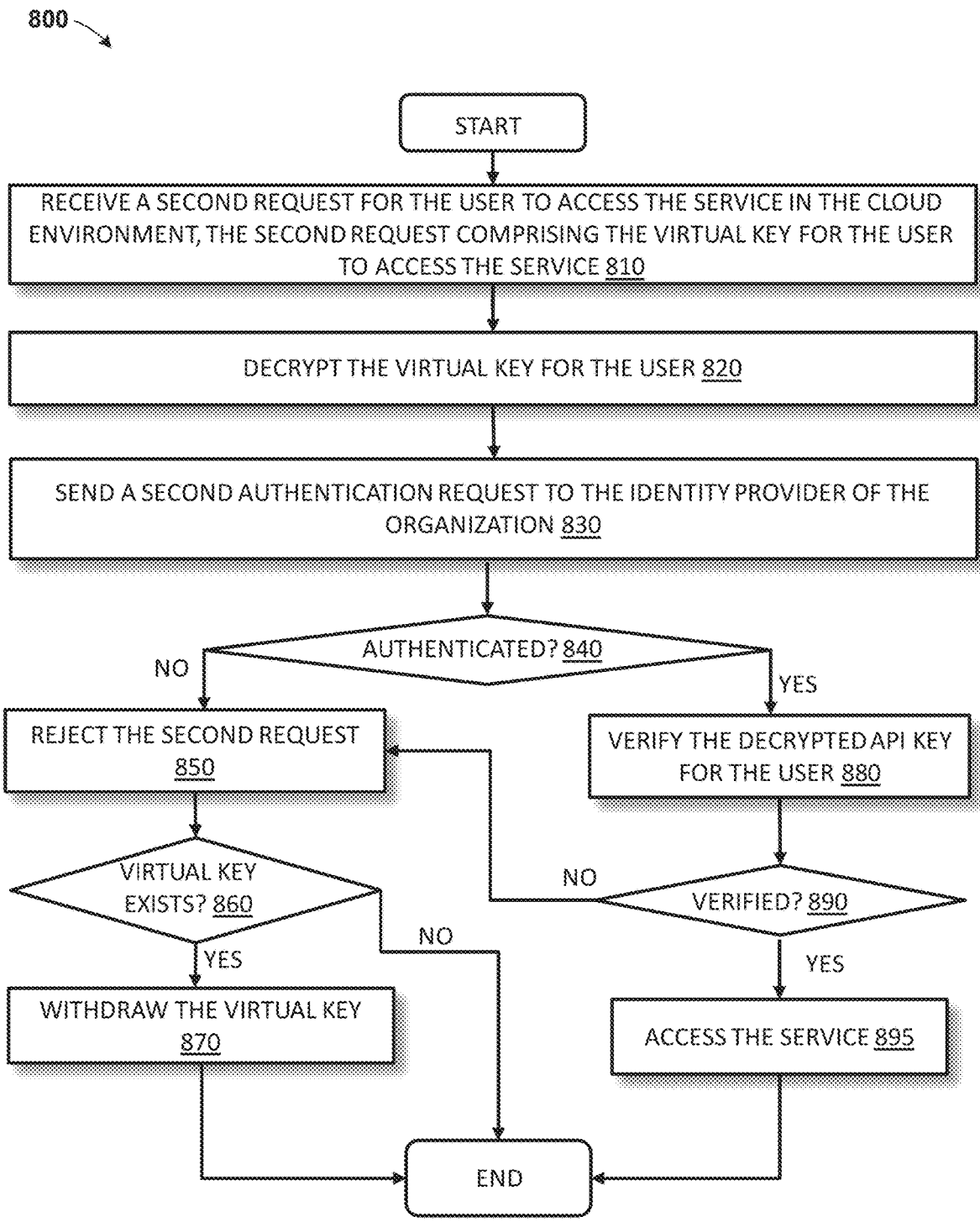
FIG. 8 depicts a flowchart for a virtual key manager in a service manager to verify the virtual key according to some embodiments.

FIG. 8 depicts a flowchart 800 for the virtual key manager 602 in the service manager 600 to verify the virtual key according to some embodiments. The flowchart 800 may be implemented by the virtual key manager 602 in the service manager 600, or other suitable computer/computing systems. For ease of understanding, the flowchart 800 will be described with reference to FIG. 6.

At 810, the virtual key manager 602 may receive a second request for the user to access the service in the cloud environment, the second request comprising the virtual key for the user to access the service.

At 820, the virtual key manager 602 may decrypt the virtual key for the user to obtain a decrypted API key, decrypted information of the organization and decrypted identity of the user in the organization.

At 830, the virtual key manager 602 may send a second authentication request to the identity provider of the organization using the decrypted information of the organization and decrypted identity of the user in the organization.

At 840, the virtual key manager 602 may determine whether the second authentication is successful or not.

If the virtual key manager 602 determines that the second authentication is unsuccessful, at 850, the virtual key manager 602 may reject the second request to avoid a security risk caused by the unprotected API key, so as to achieve the purpose of maintaining the sustainability of services and meeting strict security regulations.

Alternatively, if the second authentication is unsuccessful, at 860, the virtual key manager 602 may further determine whether there is the virtual key corresponding to the decrypted identity of the user in the organization based on the first mapping generated on 770. If the first mapping exists, i.e., the virtual key exists, the virtual key manager 602 may withdraw the virtual key by withdrawing the first mapping at 870. Then the flowchart 800 is ended.

If the second authentication is successful, the virtual key manager 602 may verify the decrypted API key for the user based a second mapping between API keys and services at 880. If the verification is successful, the virtual key manager 602 may access the service at 890. Then the flowchart 800 is ended. But if the verification is unsuccessful, the virtual key manager 602 may go to 850 to reject the second request.

The embodiments described herein may be a system, a method, and/or a computer program product at any possible technical detail level of integration. The computer program product may comprise a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium comprises the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, comprising an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, comprising a local area network (LAN) or a wide area network (WAN), or the connection may be made to an external computer (for example, through the Internet using an Internet Service Provider). In some embodiments, electronic circuitry comprising, for example, programmable logic circuitry, field-programmable gate arrays (FPGA), or programmable logic arrays (PLA) may execute the computer readable program instructions by utilizing state information of the computer readable program instructions to personalize the electronic circuitry.

The computer system, method, and computer program are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture comprising instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by one or more processors, a first request for generating a virtual key for a user in an organization to access a service in a cloud environment, wherein the first request comprises information of the organization, an identity of the user in the organization, and information of the service, and wherein an API key is required to access the service;
   sending, by the one or more processors, a first authentication request to an identity provider of the organization based on the information of the organization and the identity of the user in the organization;
   determining, by the one or more processors, whether the first authentication is successful; and
   in response to the first authentication being successful,
      determining, by the one or more processors, the API key for the organization to access the service by querying the API key for the organization to access the service to a storage which stores a mapping between API keys and organizations;
      responsive to obtaining the API key from the query, utilizing a public key to encrypt the API key, the information of the organization and the identity of the user in the organization to generate the virtual key; and
      returning, by the one or more processors, the virtual key as a response of the first request.

2. The method of claim 1, the method further comprising:
   in response to the first authentication being unsuccessful, rejecting, by the one or more processors, the first request.

3. The method of claim 1, wherein the virtual key is a phertext encrypted by a combination of the API key, the information of the organization and the identity of the user in the organization.

4. The method of claim 3, the method further comprising:
   storing, by the one or more processors, a first mapping between the virtual key for the user and the identity of the user in the organization after generating the virtual key for the user.

5. The method of claim 4, the method further comprising:
   in response to the first authentication being successful, determining, by the one or more processors, whether there is the virtual key for the user; and
   in response to there being the virtual key for the user based on the first mapping, returning, by the one or more processors, the virtual key as the response of the first request.

6. The method of claim 4, the method further comprising:
   receiving, by the one or more processors, a second request for the user to access the service in the cloud environment, the second request comprising the virtual key for the user to access the service,
   decrypting, by the one or more processors, the virtual key to obtain a decrypted API key, decrypted information of the organization, and a decrypted identity of the user in the organization;

sending, by the one or more processors, a second authentication request to the identity provider of the organization based on the decrypted information of the organization to authenticate the decrypted identity of the user in the organization;

determining, by the one or more processors, whether the second authentication is successful; and in response to the second authentication being unsuccessful, rejecting, by the one or more processors, the second request.

7. The method of claim 6, the method further comprising:

in response to the second authentication being unsuccessful, determining, by the one or more processors, whether there is the virtual key corresponding to the decrypted identity of the user in the organization based on the first mapping; and in response to there being the virtual key corresponding to the decrypted identity of the user in the organization, withdrawing, by the one or more processors, the first mapping.

8. The method of claim 6, the method further comprising:

in response to the second authentication being successful, verifying, by the one or more processors, the decrypted API key for the user based on a second mapping between API keys and services;

in response to the verifying of the decrypted API key being successful, accessing, by the one or more processors, the service; and in response to the verifying of the decrypted API key being unsuccessful, rejecting, by the one or more processors, the second request.

9. The method of claim 1, wherein the cloud environment is a public cloud environment or a hybrid cloud environment.

10. A system, comprising:

at least one processor; and a memory coupled to the at least one processor and storing instructions thereon, the instructions, when executed by the at least one processor, performing actions comprising:

receiving a first request for generating a virtual key for a user in an organization to access a service in a cloud environment, wherein the first request comprises information of the organization, an identity of the user in the organization, and information of the service, and wherein an API key is required to access the service;

sending a first authentication request to an identity provider of the organization based on the information of the organization and the identity of the user in the organization;

determining whether the first authentication is successful; and in response to the first authentication being successful, determining the API key for the organization to access the service by querying the API key for the organization to access the service to a storage which stores a mapping between API keys and organizations;

responsive to obtaining the API key from the query, utilizing a public key to encrypt the API key, the information of the organization and the identity of the user in the organization to generate the virtual key; and returning the virtual key as a response of the first request.

11. The system of claim 10, the actions further comprising:

in response to the first authentication being unsuccessful, rejecting the first request.

12. The system of claim 10, wherein the virtual key is a ciphertext encrypted by a combination of the API key, the information of the organization and the identity of the user in the organization.

13. The system of claim 12, the actions further comprising:

receiving a second request for the user to access the service in the cloud environment, the second request comprising the virtual key for the user to access the service, decrypting the virtual key to obtain a decrypted API key, decrypted information of the organization, and a decrypted identity of the user in the organization;

sending a second authentication request to the identity provider of the organization based on the decrypted information of the organization to authenticate the decrypted identity of the user in the organization;

determining whether the second authentication is successful; and in response to the second authentication being unsuccessful, rejecting the second request.

14. The system of claim 13, the actions further comprising:

in response to the second authentication being successful, verifying the decrypted API key for the user based on a second mapping between API keys and services;

in response to verifying of the decrypted API key being successful, accessing the service; and in response to verifying of the decrypted API key being unsuccessful, rejecting the second request.

15. The system of claim 10, wherein the cloud environment is a public cloud environment or a hybrid cloud environment.

16. A computer program product, comprising a non-transitory computer-readable storage medium having program instructions embodied therewith, the program instructions executable by a first component with at least one processor in a cloud computing environment to cause the at least one processor to perform actions comprising:

receiving a first request for generating a virtual key for a user in an organization to access a service in a cloud environment, wherein the first request comprises information of the organization, an identity of the user in the organization, and information of the service, and wherein an API key is required to access the service;

sending a first authentication request to an identity provider of the organization based on the information of the organization and the identity of the user in the organization;

determining whether the first authentication is successful; and in response to the first authentication being successful, determining the API key for the organization to access the service by querying the API key for the organization to access the service to a storage which stores a mapping between API keys and organizations;

responsive to obtaining the API key from the query, utilizing a public key to encrypt the API key, the information of the organization and the identity of the user in the organization to generate the virtual key; and returning the virtual key as a response of the first request.

17. The computer program product of claim 16, the actions further comprising:

in response to the first authentication being unsuccessful, rejecting the first request.

18. The computer program product of claim 16, wherein the virtual key is a ciphertext encrypted by a combination of the API key, the information of the organization and the identity of the user in the organization.

19. The computer program product of claim 18, the actions further comprising:
receiving a second request for the user to access the service in the cloud environment, the second request comprising the virtual key for the user to access the service,
decrypting the virtual key to obtain a decrypted API key, decrypted information of the organization, and a decrypted identity of the user in the organization;
sending a second authentication request to the identity provider of the organization based on the decrypted information of the organization to authenticate the decrypted identity of the user in the organization;
determining whether the second authentication is successful; and
in response to the second authentication being unsuccessful, rejecting the second request.

20. The computer program product of claim 19, the actions further comprising:
in response to the second authentication being successful, verifying the decrypted API key for the user based on a second mapping between API keys and services;
in response to verifying of the decrypted API key being successful, accessing the service; and
in response to verifying of the decrypted API key being unsuccessful, rejecting the second request.

* * * * *